United States Patent [19]

Murphy

[11] Patent Number: 5,345,985
[45] Date of Patent: Sep. 13, 1994

[54] TREE STUMP REMOVAL METHOD AND APPARATUS

[76] Inventor: Jeffrey W. Murphy, 745 - 10th Ave., Sweet Home, Oreg. 97386

[21] Appl. No.: 17,755

[22] Filed: Feb. 16, 1993

[51] Int. Cl.⁵ .................... A01G 23/06; B27M 1/00
[52] U.S. Cl. ...................... 144/329; 29/239; 37/302; 144/2 N; 254/93 R
[58] Field of Search ............... 29/239, 426.1; 37/301, 37/302, 303; 144/2 R, 2 N, 34 R, 193 R, 193 A, 329, 335, 336; 254/93 R, 132

[56] References Cited

U.S. PATENT DOCUMENTS

| | | | |
|---|---|---|---|
| 262,018 | 8/1882 | Desmond . | |
| 1,012,962 | 12/1911 | Anderson | 144/2 N |
| 3,081,066 | 3/1963 | Murawski | 29/239 |
| 3,357,085 | 12/1967 | Martin | 29/239 |
| 3,461,927 | 8/1969 | Funari | 144/2 N |
| 3,762,688 | 10/1973 | Leonhardt | 29/239 |
| 3,834,436 | 9/1974 | Burkett | 144/2 N |
| 4,048,733 | 9/1977 | Forslund | 37/302 |
| 4,411,080 | 10/1983 | Mann | 37/302 |
| 4,443,001 | 4/1984 | Haerer | 29/239 |
| 4,481,989 | 11/1984 | Peters | 144/335 |

OTHER PUBLICATIONS

Two (2) photographs of boom spike.

*Primary Examiner*—W. Donald Bray
*Attorney, Agent, or Firm*—Seed and Berry

[57] ABSTRACT

A method and apparatus for removing pieces of wood, such as stumps, from a logging site. In particular, the method entails driving a spike into a given piece of wood, attaching a line to the spike, pulling the piece of wood to a desired area away from the logging site, and then removing the spike from the piece of wood. Also provided is a spike having a head that has a first, broad width at the top of the head, a second, narrow width below the first, broad width, and one or more shafts extending from the second narrow width of the head. Further, the head of the spike has a hole therethrough able to receive a line so that the spike, upon being driven into a chunk of wood, can be pulled to the desired area. Also provided is a spike removal device wherein a forked pressure plate and a forked grabber plate are placed about the second, narrow portion of the spike, then extended away from each other, thereby contacting the broader, first section of the spike and the piece of wood, thereby removing the spike from the wood.

17 Claims, 2 Drawing Sheets

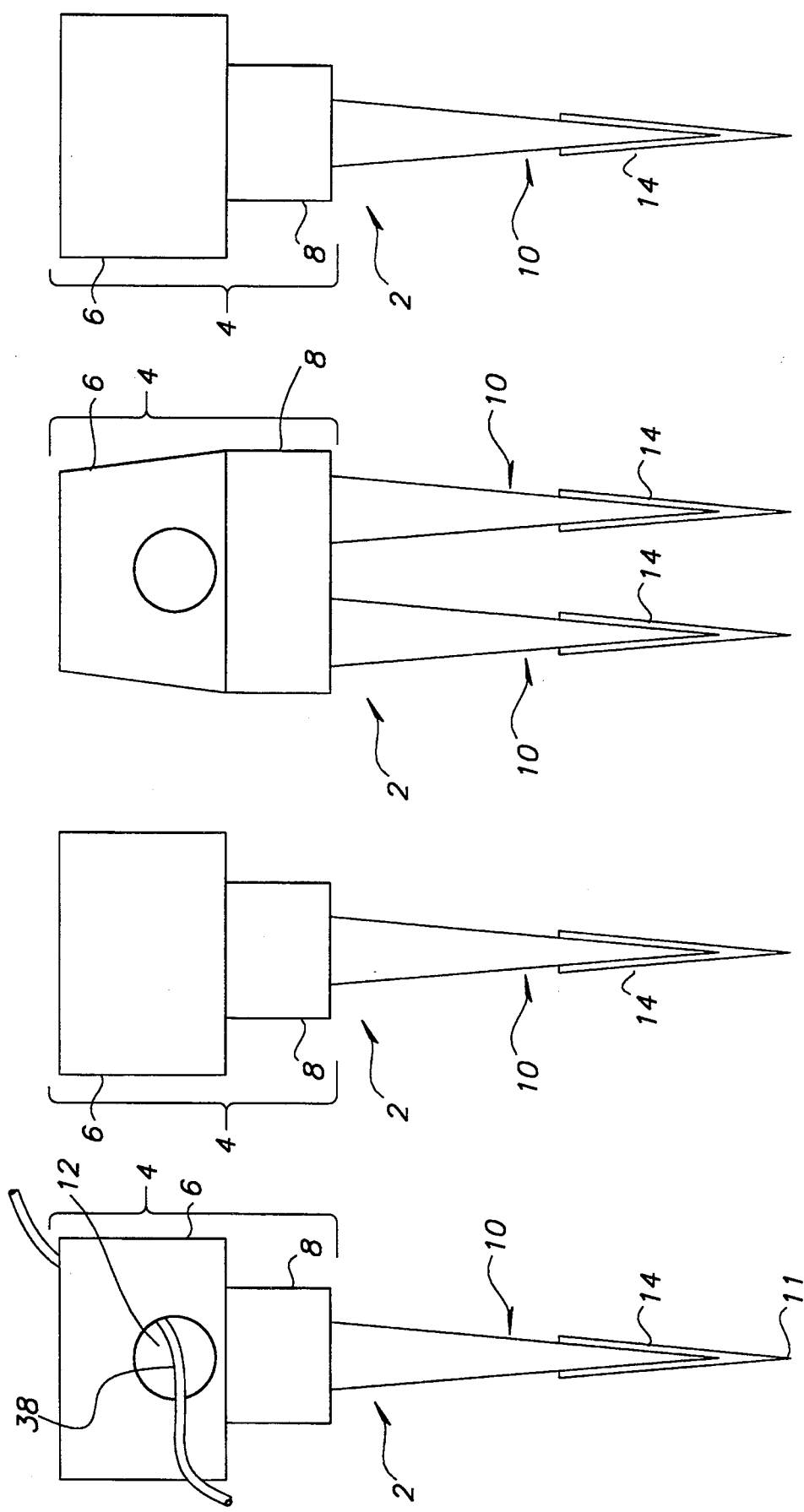

TREE STUMP REMOVAL METHOD AND APPARATUS

TECHNICAL FIELD

The field of the present invention is logging and, more particularly, the removal of tree stumps and other wood debris from a logging site.

BACKGROUND OF THE INVENTION

Prior methods and apparatus for removing tree stumps and other wood debris from a logging site include large apparatus that pull the stump from the ground, thereby causing significant damage to the ground and increasing the potential for erosion. Other prior methods and apparatus include the use of massive devices attached to bulldozers or other pieces of large machinery for cutting the stumps out of the ground.

However, there has gone unmet a need for a simple method and lightweight apparatus able to economically remove stumps without significant damage to the ground. Also unmet is a need for a method and apparatus able to remove stumps from all variety of steep and uneven terrain. Further unmet is a need for an apparatus able to be carried by a single individual and that is able to use lines and machinery routinely present at a logging site without expensive adaptations.

SUMMARY OF THE INVENTION

The present invention is directed towards a simple method and lightweight apparatus for removing pieces of wood such as tree stumps and other debris, such as wood chunks and non-wood debris able to receive a spike, from a logging site. The method and apparatus significantly reduce damage to the ground, and increase the ability to remove pieces of wood from steep and uneven terrain. The apparatus can be carried by a single individual and can use lines and machinery routinely present at a logging site.

Further, a significant feature of the present invention is that it allows removal of stumps at or near ground level. This can include the removal of stumps at an angle where the stumps are present on angled ground, such as the side of a mountain. This feature of the invention is particularly advantageous in that prior and present methods of logging, as well as safety requirements, have required that trees be cut a certain amount above the ground, thereby leaving a stump that is at least 1 foot high and which may be 5 feet high or more on one side when the stump is on a steep hill. Such stumps have, to this point, been left in the ground, thereby failing to fully utilize all of the available wood and pulp material. Also, after the area has regrown, such stumps can destroy later-cut timber that is felled upon the stumps. As much as 5 percent or more of the timber at a given logging site can be destroyed by such breakage over old stumps.

In one aspect, the present invention provides a method for removing pieces of wood from a logging site. In the method, a spike is driven into a piece of wood wherein the spike has a head suitable for receiving a line, such as a cable. The line can be attached either before or after driving the spike into the piece of wood. Then, the line is used to pull the piece of wood to a desired area, such as the landing area typically at the top of a logging site. Finally, the spike is pulled from the piece of wood, thereby allowing the wood to be used for pulp to produce paper or for other purposes, and freeing the spike for use with another piece of wood.

In a preferred embodiment of the method, the spike has a head having a first, broad width and a second, narrow width. The spike also has one or more shafts extending from the second, narrow width of the head; the shafts are suitable for penetration of a piece of wood. The head of the spike has a hole therethrough; the hole is suitable for receiving the line. Upon use in the method, the spike is driven into the piece of wood until the shaft is secured in the wood.

A line is then attached to the head of the spike. The line can be attached to multiple spikes, thereby allowing removal of multiple pieces of wood at a single instance. The line is attached at another end to a main line (attached in turn to a yarder), a bulldozer, a skidder, a chain or other device able to pull the stump to the desired area.

In a further preferred embodiment, upon placing the stump at the desired area, the spike is pulled from the stump so that the stump may be used for paper pulp or other logging purposes, and so that the spike may be used to retrieve another stump.

Preferably, the spike is removed from the piece of wood by a spike removal device having a forked pressure plate and a forked grabber plate that is able to be extended away from the forked pressure plate. To use the spike removal device, the forked pressure plate and forked grabber plate are placed about the spike, below a broader width of the spike. In the case where the spike has a head having a first, broad width and a second, narrow width, the spike removal device is preferably placed about the second, narrow width of the spike. Accordingly, the forked grabber plate contacts the broader width of the spike and the pressure plate contacts the piece of wood. Then, the forked grabber plate and the forked pressure plate are extended away from each other, thereby applying an outward pressure on the spike and simultaneously applying an opposing pressure to the piece of wood about a shaft of the spike. Accordingly, a linear motion (as opposed, for example, to a rocking motion) is used to remove the spike from the piece of wood.

The method of removing pieces of wood preferably relates to removing stumps, and further comprises initially cutting the stumps at about ground level, which means that the stumps are cut, usually by a chain saw, at or within a few inches of the ground level. This leaves the root system in the ground, to help prevent erosion, and yet does not leave a high stump able to destroy timber that is felled in the future.

It is a feature of the present invention that the method also provides a manner of lifting "tight logs," which are logs stuck such that their retrieval is difficult. Such logs may be lifted to the point where a choker can be attached to the log. It is a further feature of the invention that the method provides a means of retrieving broken logs, or other loose logs and debris. This is a particular advantage of the inventive method, because it was not reasonable to retrieve broken logs by use of a conventional means, such as a choker.

In a further aspect, the present invention provides the spike described above. Such a spike has a head having a first, broad width and a second, narrow width. The second, narrow width is disposed between the first, broad width and one or more shafts extending from the head. Preferably, the spike has a single shaft when it is to be used with a smaller stump or other piece of wood, although the spike may have two, three, or more shafts where the spike will be used for a larger stump or other piece of wood.

In yet a further aspect, the present invention provides the spike removal device described above. In particular, the spike removal device has a forked pressure plate and a forked grabber plate. The forked grabber plate is able to be extended away from the forked pressure plate, and both plates are sized to fit about a spike below a broad width of the spike. Accordingly, in use, the forked grabber plate contacts and holds the broader width of a spike (typically at or within the head of the spike), and the forked pressure plate contacts the stump or other piece of wood when placed about the spike. Preferably, the forked grabber plate and forked pressure plate are sized to fit the second, narrow width of the spike described above.

By the application of appropriate force, the forked pressure plate is extended away from the forked grabber plate, thereby applying an outward pressure on the spike relative to the piece of wood, removing the spike (held by the forked grabber plate) from the piece of wood. Appropriate forces include hydraulic, pneumatic, electrical, electromagnetic and mechanical force.

In a preferred embodiment, the grabber plate of the spike removal device is attached at an open end of a hollow cylinder. The other end of the hollow cylinder is closed. The forked pressure plate is attached at a first end of a rod located inside the hollow cylinder and is adjacent the open end of the hollow cylinder. The second end of the rod is attached to a piston sized to fit the interior diameter of the hollow cylinder. Accordingly, by reciprocating the piston within the hollow cylinder, the grabber plate and the pressure plate are extended away from each other, and then retracted for subsequent use.

Preferably, the piston is moved by the application of hydraulic or pneumatic pressure into the space located between the piston and the interior surface of the closed end of the cylinder. As will be appreciated by a person having ordinary skill in the art, the term "cylinder" as used herein includes other shapes suitable for reciprocation of a piston therein.

These and other aspects of the present invention will become evident upon reference to the following detailed description and attached drawings.

BRIEF DESCRIPTION OF THE DRAWINGS

FIGS. 1A and 1B depict front and side views of spike having a single shaft

FIGS. 2A and 2B depict a front and a side view of a spike having two shafts.

DETAILED DESCRIPTION OF THE INVENTION

Figure 4:
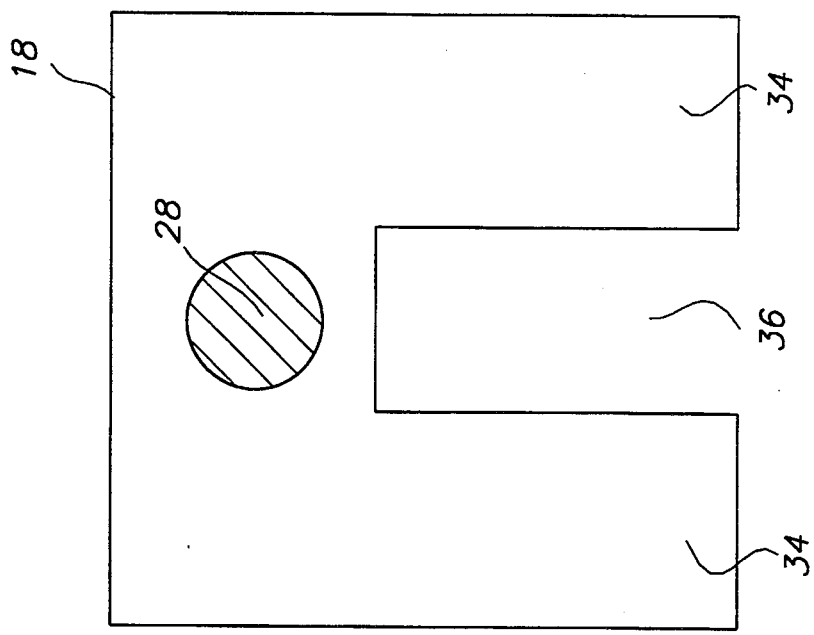
FIG. 4 depicts a plan view of the forked grabber plate of the spike removal device.

FIG. 1A depicts a spike 2 having a head 4. The head 4 has a first, broad width 6 and a second, narrow width 8. Preferably, the change in width between the first, broad width 6 and the second, narrow width 8 is stepped, as depicted in FIG. 1A. Spike 2 has a shaft 10 extending from the lower, narrow width 8 of head 4. Preferably, the shaft 10 has a pointed tip 11 so that it may be more easily driven into a stump or other piece of wood. Further preferably, the shaft 10 has vanes 14 located near tip 11. The spike is made of a material such as steel that is able to be driven into the piece of wood, for example by a 3 to 4 pound maul.

The head 4 of the spike 2 has a hole 12 therethrough. The hole 12 is sized to receive a cable or other line 38, and further preferably is sized to slide along the cable or other line 38.

In preferred embodiments, the head of the spike 2 is typically from about 3 to 5 inches in height, and preferably about 4 inches in height. The first, broad width 6 of the head 4 of the spike 2 is typically from about 2 to 3½ inches in diameter, and preferably about 2¼ to 2¾ inches in diameter. The first, broad width 6 of the head 4 is typically from about 1½ to 2½ inches in height, and preferably about 2 inches in height. The second, narrow width 8 is preferably from about 1 to 3 inches in height and preferably about 2 inches in height. The second, narrow width 8 of the head 4 is typically from about 1 to 1½ inch in diameter, and preferably about 1¼ inch in diameter.

The spike 2 is typically from about 6 to 10 inches in length and preferably about 8 inches in length. The shaft 10 of the spike is typically from about 3 to 6 inches in length, and preferably about 4½ inches in length. The vanes 14 near the tip 11 of the shaft 10 are typically from about 1 to 3 inches in length and preferably about 2 inches in length.

Turning to FIG. 2A, a spike 2 having two shafts 10 is depicted. Spikes containing more than two shafts are also possible. In the embodiment depicted, the second, narrow width 8 of the head 4 is approximately the same size as the first, broad width 6 when viewed from the front. But, when viewed from the side, as in FIG. 2B, the spike 2 has approximately the same dimensions as the spike depicted in FIGS. 1A and 1B. The preferred dimensions of the spike depicted in FIGS. 2A and 2B are similar to the dimensions of the spike depicted in FIG. 1, except that, when viewed from the front, as in FIG. 2A, the width of the second, narrow width 8 of the spike is typically from about 2 to 3½ inches and preferably about 2¼ to 2¾ inches, and the first, broad width 6 of the head preferably tapers slightly from its side adjacent the second, narrow width 8 to the upper surface of the spike.

Figure 3:
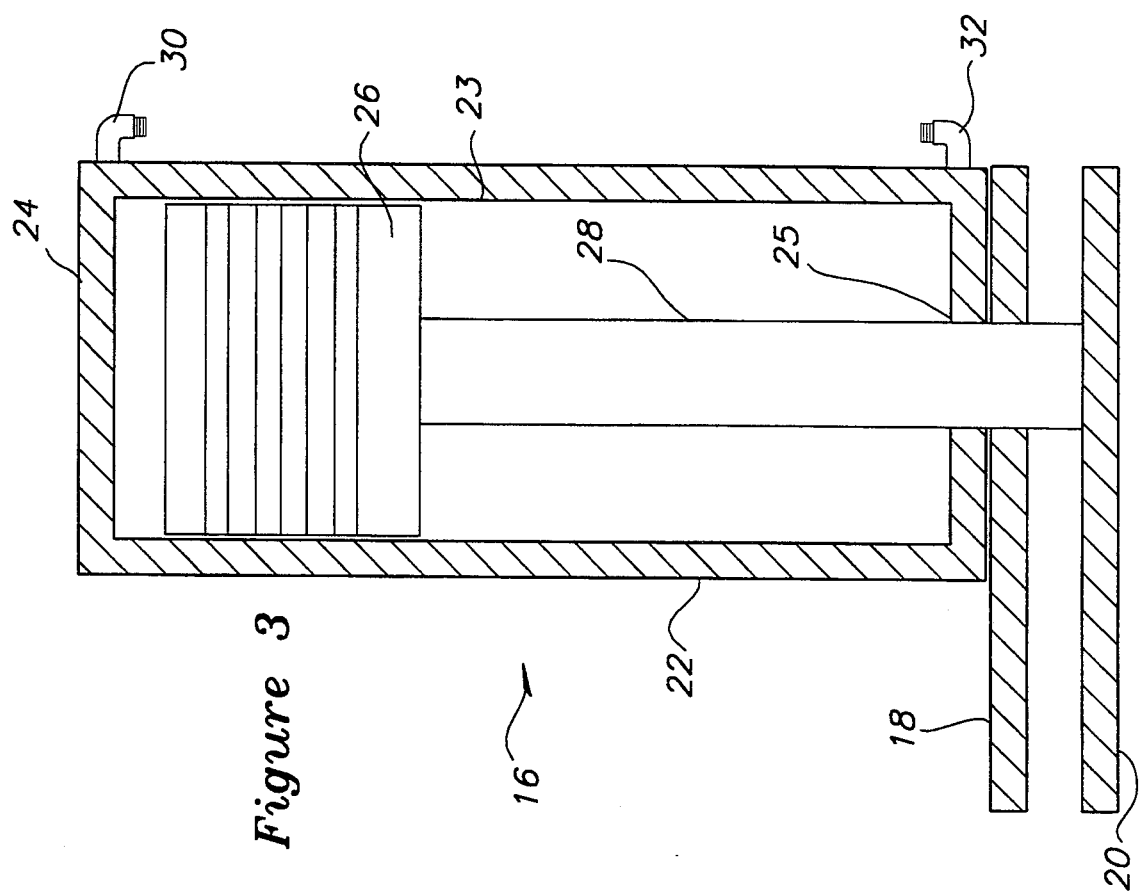
FIG. 3 depicts a side view of a spike removal device.

FIG. 3 depicts a spike removal device 16. The spike removal device 16 has a hollow cylinder 22 with a closed end 24 and an open end 25. The open end 25 has a forked grabber plate 18 attached thereto. Extending through the open end 25 of hollow cylinder 22 is a rod 28 having a forked pressure plate 20 attached thereto. The forked grabber plate 18 and forked pressure plate 20 are sized such that they may be placed about the lower, narrow section 8 of spike 2. The other end of rod 28 is attached to a piston 26 sized to fit the interior diameter of hollow cylinder 22. The forked pressure plate 20 is located near the forked pressure plate 18 when the piston 26 is near the closed end 24 of hollow cylinder 22. The hollow cylinder 22 has an inlet valve 30 and outlet valve 32 for the provision of hydraulic or pneumatic force to cause the piston to move axially within the cylinder 22. In an alternative embodiment, the inlet and outlet valves are both located above the piston.

Upon the application of hydraulic or pneumatic force through valve 30, piston 26 is forced downward in cylinder 22, thereby causing forked pressure plate 20 to be extended away from forked grabber plate 18. When forked grabber plate 18 and forked pressure plate 20 are placed about a spike driven into a piece of wood, the extension of forked pressure plate 20 away from forked grabber plate 18 applies an outward pressure on the spike and removes the spike from the piece of wood.

FIG. 4 depicts a forked grabber plate 18 as seen from above. The forked grabber plate 18 has arms 34 with a space 36 therebetween, the space 36 sized to fit a lower, narrower portion of spike 2. In alternative embodiments, the space 36 may be V-shaped such that forked grabber plate (and forked pressure plate 20) can be suitably sized to fit more than one size of spike.

In alternative embodiments, the spike removal device may be powered by electric, electromagnetic or mechanical force. The force can be supplied by machinery routinely present at a logging site, such as a bulldozer tractor, an electric generator or a compressed air generator. Devices for generation and transmission of such force to the spike removal device 16 are well known in the art.

The present embodiments of this invention are to be considered in all respects as illustrative and not restrictive, the scope of the invention being indicated by the appended claims, and all changes which come within the meaning and range of equivalency of the claims therefore are intended to be embraced therein.

I claim:

1. A method of removing a piece of wood from a logging site comprising:
   (a) driving a spike into the piece of wood, the spike having a head suitable for receiving a line; and
   (b) attaching the spike to the line; then
   (c) pulling the piece of wood via the line to a desired area; and then
   (d) removing the spike from the piece of wood.

2. The method of claim 1 wherein
   (a) the head of the spike has a first, broad width and a second, narrow width, the head having one or more shafts extending from the second, narrow width, the head further having a hole suitable for receiving the line; and
   (b) wherein the spike is attached to the line by passing the line through the hole.

3. The method of claim 1 wherein the spike is removed from the piece of wood by a spike removal device having a forked pressure plate and a forked grabber plate able to be extended away from the forked pressure plate, the forked pressure plate and forked grabber plate sized to fit a narrow width of the spike, and wherein the spike is removed by extending the forked pressure plate away from the forked grabber plate, thereby applying an outward pressure on the spike and simultaneously applying an opposing pressure to the piece of wood about a shaft of the spike.

4. The method of claim 2 wherein the spike is removed from the piece of wood by a spike removal device having a forked pressure plate and a forked grabber plate able to be extended away from the forked pressure plate, the forked pressure plate and forked grabber plate sized to fit the second, narrow width of the spike, and wherein the spike is removed by extending the forked pressure plate away from the forked grabber plate, thereby applying an outward pressure on the spike and simultaneously applying an opposing pressure to the piece of wood about the shaft of the spike.

5. The method of claim 4 wherein the spike removal device comprises the forked grabber plate attached to a first, open end of a hollow cylinder, the forked pressure plate attached at the first end of a rod, a second end of the rod attached to a piston sized to fit the interior diameter of the hollow cylinder, the piston located near a second, closed end of the hollow cylinder when the forked grabber plate and the forked pressure plate are not extended away from each other, and the piston is able to reciprocate in the hollow cylinder by the application of appropriate force, and wherein the spike is removed by extending the forked pressure plate away from the forked grabber plate, thereby applying an outward pressure on the spike and simultaneously applying an opposing pressure to the piece of wood about the shaft of the spike.

6. The method of claim 5 wherein the force is selected from the group consisting of hydraulic force and pneumatic force.

7. The method of claim 1 wherein the piece of wood is a stump and the method further comprises, before driving the spike into the stump, cutting the stump at about ground level.

8. The method of claim 5 wherein the piece of wood is a stump and the method further comprises, before driving the spike into the stump, cutting the stump at about ground level.

9. The method of claim 1 wherein the line is releasably attached to the spike and, after removal of the spike from the piece of wood, steps (a) through (d) are repeated on a second piece of wood.

10. A spike having a head having a first, broad width and a second, narrow width, the spike further having one or more shafts extending from the second, narrow width, the head having a hole therein suitable for receiving a line.

11. The spike of claim 10 wherein the hole is located in the first, broad width.

12. The spike of claim 10 wherein the spike has one shaft.

13. The spike of claim 10 wherein the spike has two shafts.

14. The spike of claim 10 wherein the one or more shafts have vanes near the tip of the shaft.

15. A spike removal device comprising:
   a forked pressure plate and a forked grabber plate able to be extended away from the forked pressure plate, the forked pressure plate and forked grabber plate sized to fit a spike about a narrow width of the spike, the forked grabber plate attached to a first, open end of a hollow cylinder, and the forked pressure plate attached at the first end of a rod, a second end of the rod attached to a piston sized to fit the interior diameter of said hollow cylinder, the piston located near a second, closed end of the hollow cylinder when the forked grabber plate and the forked pressure plate are not extended away from each other, and the piston is able to reciprocate in the hollow cylinder by the application of appropriate force.

16. The spike removal device of claim 15 wherein the forked pressure plate and the forked grabber plate are sized to fit the second, narrow width of the spike of claim 8.

17. The spike removal device of claim 15 wherein the force is selected from the group consisting of hydraulic force and pneumatic force.

* * * * *